United States Patent [19]

Rau et al.

[11] 4,047,576

[45] Sept. 13, 1977

[54] CULTIVATOR WHEEL FOR AGRICULTURAL MACHINES

[75] Inventors: Willy Rau, Weilheim, Teck; Christian Taus, Kirchheim, Teck, both of Germany

[73] Assignee: Maschinenfabrik Rau OHG, Weilheim, Teck, Germany

[21] Appl. No.: 605,186

[22] Filed: Aug. 15, 1975

[30] Foreign Application Priority Data

Aug. 17, 1974 Germany ............................ 2439595
July 26, 1975 Germany ............................ 2533625

[51] Int. Cl.$^2$ ............................................ A01B 15/16
[52] U.S. Cl. .................................. 172/540; 172/120; 172/555
[58] Field of Search ............... 172/555, 540, 541, 543, 172/548, 549, 550, 551, 556, 120, 604

[56] References Cited

U.S. PATENT DOCUMENTS

| | | | |
|---|---|---|---|
| 355,405 | 1/1887 | Lillie | 172/120 X |
| 369,163 | 8/1887 | Clark | 172/555 |
| 1,317,432 | 9/1919 | Crum et al. | 172/549 |
| 2,012,434 | 8/1935 | Pedersen | 172/548 UX |
| 2,575,321 | 11/1951 | Traver | 172/555 |
| 2,596,527 | 5/1952 | Bushong | 172/555 |
| 2,691,933 | 10/1954 | Emerson | 172/555 X |
| 3,107,737 | 10/1963 | Van Sickle et al. | 172/548 |
| 3,125,166 | 3/1964 | Hines, Sr. | 172/120 |

FOREIGN PATENT DOCUMENTS

| | | | |
|---|---|---|---|
| 35,626 | 1/1966 | Finland | 172/604 |
| 986,352 | 3/1965 | United Kingdom | 172/540 |

Primary Examiner—Paul E. Shapiro
Attorney, Agent, or Firm—Michael J. Striker

[57] ABSTRACT

A cultivator wheel is disclosed for use in agricultural machines. It has a hub and tines which project substantially radially from the hub and are provided with pointed outer end portions. These tines are bent out of the central radial plane of the wheel. Portions of the wheel are formed with cutting edges that are inclined circumferentially of the wheel as well as relative to the central radial plane of the same.

12 Claims, 10 Drawing Figures

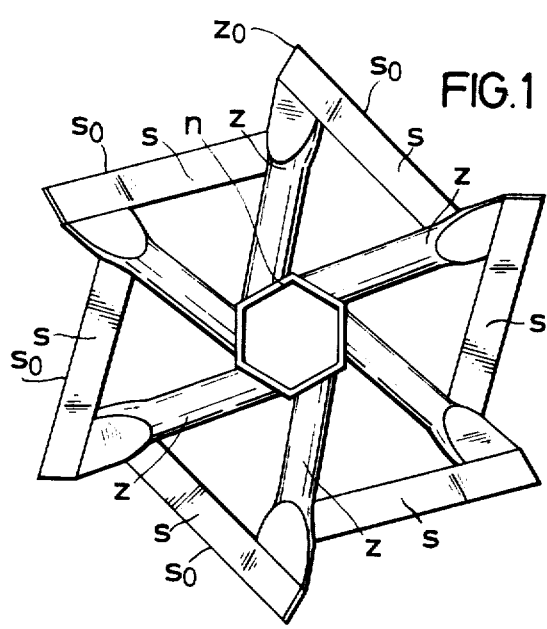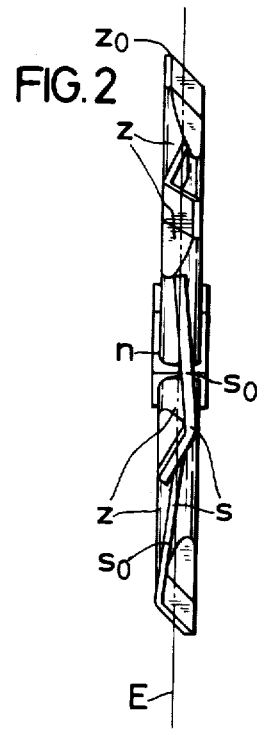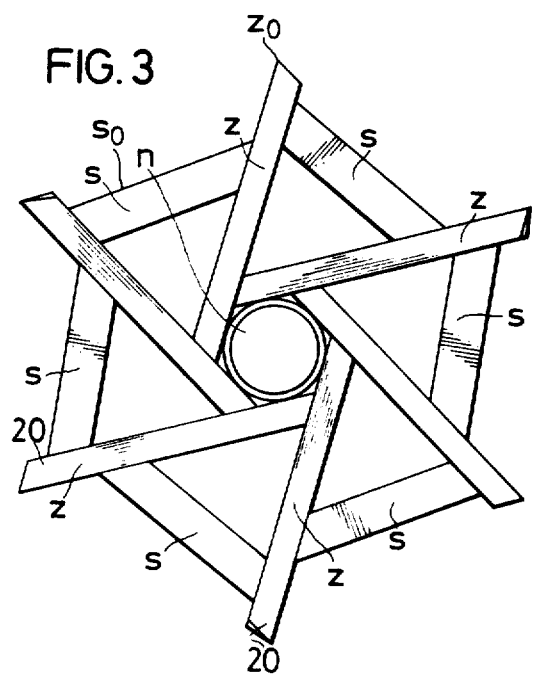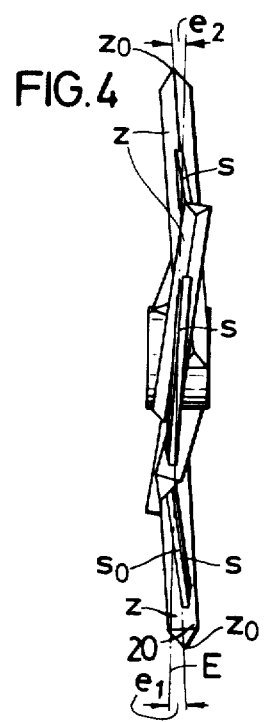

CULTIVATOR WHEEL FOR AGRICULTURAL MACHINES

BACKGROUND OF THE INVENTION

This invention relates generally to agricultural machines, and in particular to a cultivator wheel for use in such machines.

Cultivator wheels have the purpose of breaking up and loosening the soil, usually after the soil has previously been plowed. Plowing turns over clumps of soil, which must then be broken up and converted into loose soil particles in order to prepare the soil for planting. Of course, cultivator wheels for this purpose are known; they are usually in form of a substantially star-shaped sheet-metal member that is provided with teeth, or else they have a hub from which nail-like projections extend. While they are usable for their intended purpose, these prior art cultivator wheels are not nearly as effective as they are desired to be.

SUMMARY OF THE INVENTION

It is therefore a general object of the invention to overcome the prior-art disadvantages.

More particularly, it is an object of the invention to provide an improved cultivator wheel for agricultural machines which avoids these disadvantages.

A more specific object of the invention is to provide such a cultivator wheel which is highly effective in breaking up clumps and clods of soil as small as possible, mixing the soil particles of the thus broken-up clumps, slightly compacting the soil particles at the seed-placement level (i.e., slightly below the soil surface) and providing a loose soil surface above the seed-placement level.

In keeping with these objects, and with others which will become apparent hereafter, one feature of the invention resides in a cultivator wheel for agricultural machines which, briefly stated, comprises a hub, a plurality of tines that project radially of the hub and have pointed end portions and which tines are bent out of the central radial plane of the wheel. Circumferentially extending portions of the wheel connect the pointed end portions of respective circumferentially spaced tines and are provided with cutting edges which are inclined substantially radially and also with reference to the aforementioned central radial plane of the wheel.

A cultivator wheel constructed in this manner will cut the soil, in that the tines part the soil, the cutting edges cut through the soil clumps and the surfaces of the portions provided with the cutting edges—which surfaces are inclined to the central radial plane of the wheel—exert a lateral thrust upon the cut-apart soil which tends to slightly compact the soil particles.

It is currently preferred if the circumferentially successive tines are alternately inclined to opposite sides of the central radial plane of the wheel, because this has been found to produce an especially effective loosening of the soil and very good mixing of the particles thereof.

The cutting edges may be offset from the points of the tines, i.e., begin and end at a certain distance from these points. They may also be formed on the side edges of the tines themselves. A particularly simple and especially effective embodiment is obtained if the cutting edges extend immediately to the points of the tines, so that these points in effect constitute the ends of the respective cutting edges.

The wheel can be constructed in a particularly simple and inexpensive manner if the tines are of triangular shape. The effectiveness of such tines is especially pronounced if the triangular shape is that of an asymmetrical triangle having one side which is steeply inclined relative to the wheel circumference and another side which is slightly inclined relative to the wheel circumference and provided with the respective cutting edge.

In a currently preferred construction the wheel of the present invention is a sheet-metal member having a central section which can be mounted on a shaft or the like, and outer sections which are bent to extend at angles relative to the central section and which form the tines and are provided with the respective cutting edges. The bending lines of the outer sections may with advantage be inclined to radial lines of the wheel which pass through the center of the central section and through the points of the respective tine end portions. Such a wheel can be manufactured very simply and inexpensively of a single piece, or substantially of a single piece, by pressing or stamping.

A further important aspect of the invention is the manner in which the wheel may be mounted on a drive shaft with which it is to turn, especially if the wheel is to be used in an agricultural machine wherein a plurality of such wheels are mounted axially adjacent to one another. A wheel according to the invention may for this purpose have a preferably plate-like center section formed with an opening from the edge of which various apertures or cut-outs extend outwardly to permit soil particles to pass therethrough. Of course, the cut-outs could also be separate from the opening, but if they do extend from the edge thereof the overall configuration of the cut-outs and opening combined may resemble the shape of a clover-leaf. Soil particles and soil clumps which are lifted up by the respectively adjacent wheels can either pass freely through these cut-outs or become crushed as they attempt to pass through them, but in case will cause the lateral movement of the soil to be hindered.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 1 and 2 are an end view and a side view of a cultivator wheel according to one embodiment of the invention;

FIGS. 3 and 4 are similar to FIGS. 1 and 2 but illustrate another embodiment of the invention;

DESCRIPTION OF THE PREFERRED EMBODIMENTS

Figure 5:
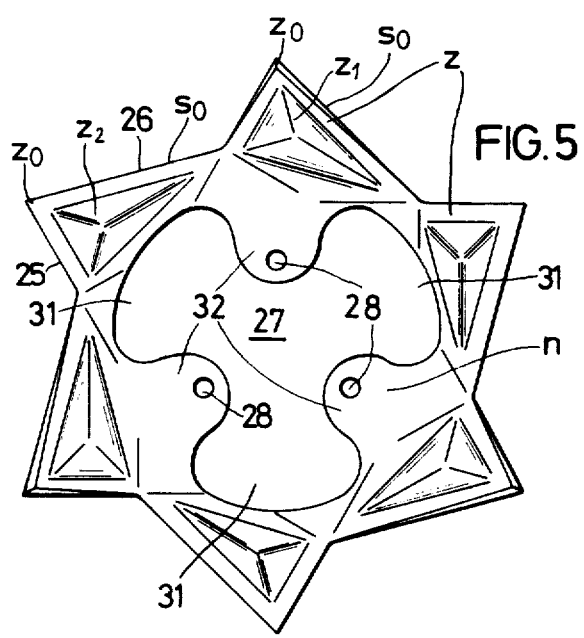
FIGS. 5 and 6 are also similar to FIGS. 1 and 2 but show a further embodiment of the invention.

As the basic inventive concept is the same in all the embodiments of FIGS. 1-9, like reference numerals have been employed throughout in the several Figures.

Thus, the hub of the respective cultivator wheel is always designated with character $n$, the tines with $z$ and the cutting edges with $s_o$; the latter extend in circumferential direction of the wheel either directly from the points or tips $z_o$ of the tines $z$, or they begin at a certain distance therefrom, but they always extend substantially radially inwardly from the region of the points $z_o$. The tines $z$ are bent outwardly of a central radial plane E of the wheel, preferably to alternately opposite sides of this plane. Because of this, the cutting edges $s_o$ are inclined relative to the plane E as well as in circumferential direction of the wheel; they extend substantially radially inwardly from an imaginary circle passing through all of the points $z_o$ and the surfaces of which the cutting edges form a boundary are also alternately twisted or inclined in one or the opposite direction relative to the plane E, i.e., in or the opposite axial direction of the wheel.

The wheel in the embodiment of FIGS. 1 and 2 has a hub $n$ which is a hollow tubular body of polygonal (here hexagonal) cross-section. The tines $z$ extend radially outwardly from the respective six sides of the hub $n$ in a spoke-like configuration. In this embodiment the cutting edges $s_o$ are formed on strip-shaped members $s$ which are secured to the outer end portions of the tines $z$, e.g. by welding, in such a manner that one end of each cutting edge $s_o$ extends to a respective point $z_o$. The members $s$ are alternately (in circumferential direction) inclined to one and to the other side of the central plane E. The ends of the members $s$ opposite the ones where the cutting edges extend to the points, are connected to respective tine end portions inwardly of the points thereof. Hub $n$, tines $z$ and members $s$ form a rigid unit, e.g. by being welded together.

FIGS. 3 and 4 show an embodiment wherein the tines $z$ are straight and of solid, triangular cross-section. Their outer ends are inclined or bevelled and form the points $z_o$. The inner end portions of the tines $z$ in this embodiment abut tangentially against the outer side of the hub $n$ which in this case is of hollow cylindrical shape; preferably, the inner end portions are welded to the hub $n$. The tines $z$ are also inclined to the center plane E so that their end portions 20 which extend outwardly beyond the members $s$ (these resemble the ones of FIGS. 1 and 2) are spaced axially of the wheel from the plane E by a distance $e_1$ or $e_2$, respectively, at opposite sides of the plane E as shown in FIG. 4. The latter Figure further shows that the member $s$ are also alternately inclined towards opposite sides of the plane E, their edges which face towards the plane E being formed with the cutting edges $s_o$.

Figure 6:
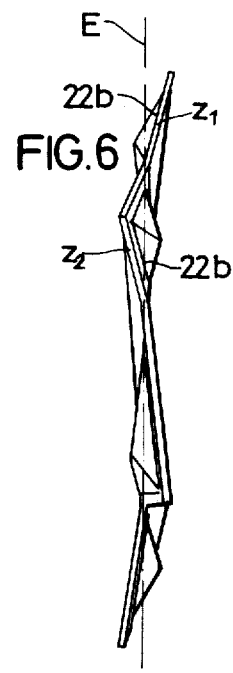

Coming to the embodiment of FIGS. 5 and 6 it will be seen that the tines $z$ include tines $z_1$ and $z_2$ which are part of a one-piece sheet-metal member having a center section. The tines are of triangular outline and the base of the respective triangle approximately coincides with the circumference of the center section. In axial direction of the wheel the triangular tines are asymmetrical, in that they are each bounded in one circumferential direction by a shorter side 25 and in the other circumferential direction by a longer side 26. The longer sides 26 are provided with the cutting edges $s_o$.

The sheet-metal member of which the wheel in this embodiment is formed, is shaped by pressing or the like so that the tines $z_1$ extend to one side of the central radial plane E of the wheel, whereas the tines $z_2$ which alternate with the tines $z_1$ circumferentially of the wheel extend to the other side of the plane E. Also, the tines $z_1$ and $z_2$ are alternately bowed out to opposite sides of the plane E (see FIG. 6), so that surfaces 22b are formed which are inclined to the plane E.

The center section is formed with an opening 27 through which a mounting shaft is to be extended. It is also provided with cut-outs 31 whose cross-section increases in their radially outer portions and which extend outwardly from the edge bounding the center opening 27 to form with the latter a clove-leaf shaped hole. The purpose of these cut-outs is the one explained before, i.e., to permit passage of soil that has been picked up and is discharged laterally by an axially adjacent wheel. The portions 32 which are located intermediate the cut-outs 31 are provided with holes 28 for securing the wheel to a shaft or the like, e.g. to a flange of such a shaft.

Figure 7:
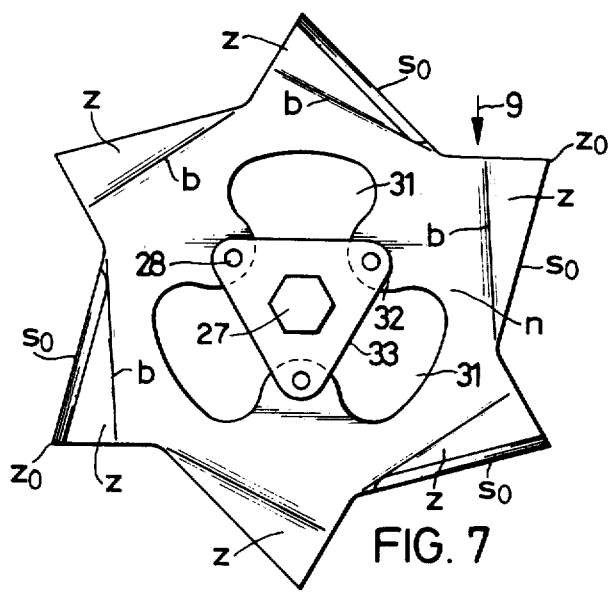
FIGS. 7 and 8 illustrate still another embodiment of the invention in views similar to those of FIGS. 1 and 2.
Figure 8:
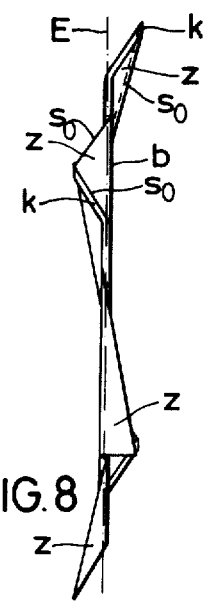
Figure 9:
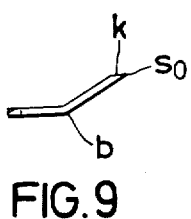
FIG. 9 shows a fragmentary detail of FIG. 7 as seen in the direction of the arrow 9 in that Figure.

FIGS. 7-9, finally, show still another embodiment which is reminiscent of that in FIGS. 5 and 6. The main difference, in fact, is that the tines $z$ are simply bent in alternately opposite axial directions of the wheel out of the plane E, about bending lines $b$ which are inclined to radii passing through the center of the wheel and through the points $z_o$ of the tines $z$, and extend to the juncture of the respective tine with a circumferentially adjacent one. One edge of the respective tines $z$ extends at a relatively slight inclination to the circumference of the wheel and is provided with a cutting edge $s_o$ that is formed by providing a bevel $k$ (see FIG. 9).

FIG. 7 also shows in broken lines a mounting flange for mounting the wheel on a shaft or the like. This mounting flange is identified with reference numeral 33 and provided with holes which in use register with the holes 28 of the wheel, so that screws or the like can be passed through the registering holes of wheel and mounting flange. The triangular shape of flange 33 leaves the cut-outs 31 sufficiently exposed so that soil can pass through them for the purposes described earlier. Side edges of the flange 33 can be bent on one or the other axial direction of the wheel, if desired, in order to further increase the effective cross-section for the passage of soil.

The wheel according to the present invention can be used singly. It can, however, also be used in multiples, where successive wheels are arranged axially adjacent one another, e.g. on a common shaft. Generally, such wheels are arranged in agricultural machines in several adjacent rows, the wheels of one row being offset relative to the wheels of the adjacent row or rows in direction transverse to the direction of operational movement of the agricultural machine.

The wheels can be mounted so that they rotate in either one or the opposite circumferential direction; however, it is preferred that they be mounted to rotate in the direction $f$ (see FIG. 7) when the machine advances in the direction F. The wheels then roll on the soil and the cutting edges $s$ penetrate into the soil during each revolution and cut and break up any soil clumps.

A grading attachment may be provided on the machine ahead of the cultivator wheels, i.e., an attachment which levels the ground as much as possible ahead of the wheels, especially to eliminate tracks left by the wheels of a tractor pulling the machine, so that the work performed by the cultivator wheels is still more uniform.

Figure 10:
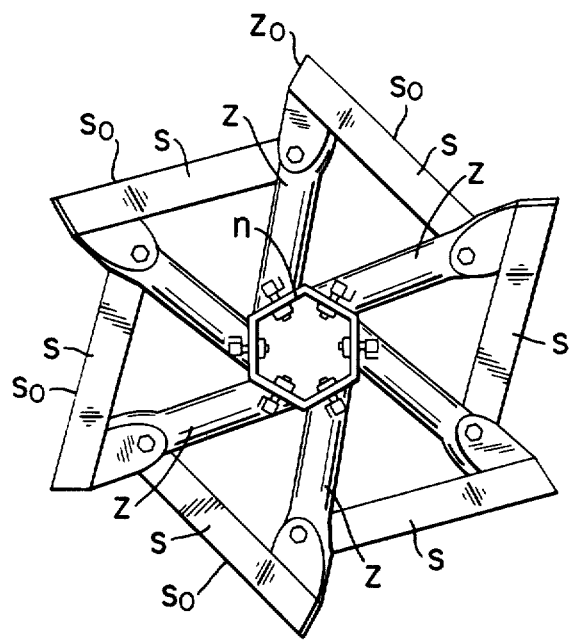
FIG. 10 is similar to FIG. 1 but illustrates an additional embodiment of the invention.

It is evident that various modifications may be made in the exemplary embodiments. For example, the tines can each be individually connected to the respective hub, e.g. by means of nuts and bolts or the like, for instance, as shown in FIG. 10 so that each tine can be separately replaced with a new one if it becomes damaged or worn. The members s can be similarly connected to the tines.

It will be understood that each of the elements described above, or two or more together, may also find a useful application in other types of constructions differing from the types described above.

While the invention has been illustrated and described as embodied in a cultivator wheel, it is not intended to be limited to the details shown, since various modifications and structural changes may be made without departing in any way from the spirit of the present invention.

Without further analysis, the foregoing will so fully reveal the gist of the present invention that others can, by applying current knowledge, fairly adapt it for various applications without omitting features that, from the standpoint of prior art, fairly constitute essential characteristics of the generic or specific aspects of the invention.

What is claimed as new and desired to be protected by Letters Patent is set forth in the appended claims.

1. A cultivator wheel having an axis and adapted for rotation about said axis, comprising a hub; a plurality of successive triangular tines having pointed end portions and being distributed about said hub, successive ones of said tines being bent in opposite directions out of a central radial plane of said wheel, said tines having shorter sides and longer sides, said shorter sides of said tines extending nonradially relatve to said axis, said longer sides of said tines being provided with cutting edges each extending substantially along the full length of the respective one of said longer sides and inclined to said central radial plane; said wheel being provided with openings between said cutting edges and said hub.

2. A cultivator wheel as defined in claim 1, wherein each of said tines is twisted in itself relative to said central radial plane.

3. A cultivator wheel as defined in claim 1, wherein said cutting edges extend to the points of said pointed end portions.

4. A cultivator wheel as defined in claim 1, wherein said tines have the shape of an asymmetric triangle having one side which is steeply inclined relative to the circumferential direction of said wheel and another side which is slightly inclined relative to said circumferential direction and is formed with a cutting edge.

5. A cultivator wheel as defined in claim 1, wherein said wheel is substantially composed of sheet metal which forms said hub and said tines.

6. A cultivator wheel as defined in claim 5, said sheet metal having a center section forming said hub and outer sections which form said tines, said outer sections being bent relative to said center section along bending lines which are inclined to radial lines passing through said hub and the points of the respective tine end portions.

7. A cultivator wheel as defined in claim 1, wherein said tines are of substantially triangular outline and bowed transversely out of said center plane.

8. A cultivator wheel as defined in claim 1, wherein said wheel is composed of a plurality of connected members each forming one of said tines, so that any member can be replaced at the will of a user.

9. A cultivator wheel for agricultural machines, comprising a hub; a plurality of tines projecting radially of said hub and having pointed end portions, said tines being bent out of central radial plane of said wheel and provided with cutting edges inclined substantially radially; said hub having a center opening and being provided with cut-outs forming radial bays extending outwardly from said center opening.

10. A cultivator wheel as defined in claim 9, wherein said opening forms with said cut-outs a hole of approximately clover-leaf shaped outline.

11. A cultivator wheel having an axis and rotatable in a predetermined direction about said axis, said wheel comprising a hub; a plurality of successive triangular tines having pointed end portions and being distributed about said hub, successive ones of said tines being bent in opposite directions out of a central radial plane of said wheel, said tines having shorter sides and longer sides, said short sides of said tines extending nonradially relative to said axis, said longer sides of said tines being provided with cutting edges each extending substantially along the full length of the respective one of said longer sides and inclined to said central radial plane, each of said longer sides of said tines leading the respective shorter side thereof relative to said predetermined direction; said wheel being provided with openings between said cutting edges and said hub.

12. A cultivator wheel comprising a hub having a center opening and cut-outs extending radially outwardly of said center opening for the passage of soil particles therethrough; a plurality of successive triangular tines having pointed end portions and being distributed about said hub, successive ones of said tines being bent in opposite directions out of a central radial plane of said wheel, said tines having shorter sides and longer sides, said longer sides of said tines being provided with cutting edges inclined to said central radial plane; said wheel being provided with openings between said cutting edges and said hub; and a mounting flange mounted on said hub overlying said center opening and having a shaft-receiving aperture of polygonal cross section.

* * * * *